United States Patent
Krasovskiy et al.

(10) Patent No.: US 12,503,579 B2
(45) Date of Patent: Dec. 23, 2025

(54) ETHYLENE-BASED POLYMER COMPOSITION WITH BRANCHING AND PROCESS FOR PRODUCING THE SAME

(71) Applicant: Dow Global Technologies LLC, Midland, MI (US)

(72) Inventors: Arkady L. Krasovskiy, Lake Jackson, TX (US); Ivan A. Konstantinov, Manvel, TX (US); Sarat Munjal, Lake Jackson, TX (US); Sean W. Ewart, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 850 days.

(21) Appl. No.: 17/779,765

(22) PCT Filed: Nov. 11, 2020

(86) PCT No.: PCT/US2020/059949
§ 371 (c)(1),
(2) Date: May 25, 2022

(87) PCT Pub. No.: WO2021/108131
PCT Pub. Date: Jun. 3, 2021

(65) Prior Publication Data
US 2023/0047114 A1    Feb. 16, 2023

Related U.S. Application Data

(60) Provisional application No. 62/940,612, filed on Nov. 26, 2019.

(51) Int. Cl.
*C08L 23/08*    (2025.01)
*C08F 2/01*    (2006.01)
(Continued)

(52) U.S. Cl.
CPC ............. *C08L 23/08* (2013.01); *C08F 2/01* (2013.01); *C08F 2/38* (2013.01); *C08F 236/06* (2013.01);
(Continued)

(58) Field of Classification Search
None
See application file for complete search history.

(56) References Cited

U.S. PATENT DOCUMENTS

| | | |
|---|---|---|
| 5,539,075 A | 7/1996 | Gustafsson et al. |
| 9,334,348 B2 | 5/2016 | Berbee et al. |

(Continued)

FOREIGN PATENT DOCUMENTS

JP    2000154279 A  *  6/2000  ............. C08L 53/02

OTHER PUBLICATIONS

Machine translation of JP2000154279 obtained from the European Patent Office website in Nov. 2025 (Year: 2020).*

*Primary Examiner* — Robert C Boyle
*Assistant Examiner* — Devin Mitchell Darling
(74) *Attorney, Agent, or Firm* — Boyle Fredrickson S.C.

(57) ABSTRACT

The present disclosure provides a composition. In an embodiment, the composition is an ethylene-based polymer composition formed by high pressure (greater or equal to 100 MPa) free radical polymerization. The composition includes ethylene monomer and a mixture of hydrocarbon-based molecules. Each hydrocarbon-based molecule includes three or more internal alkene groups.

15 Claims, 1 Drawing Sheet

(51) Int. Cl.
*C08F 2/38* (2006.01)
*C08F 236/06* (2006.01)
*C08F 236/22* (2006.01)

(52) U.S. Cl.
CPC ........ *C08F 236/22* (2013.01); *C08F 2500/29* (2021.01); *C08L 2203/16* (2013.01); *C08L 2203/202* (2013.01); *C08L 2207/066* (2013.01)

(56) References Cited

U.S. PATENT DOCUMENTS

| | | |
|---|---|---|
| 9,944,733 B2 | 4/2018 | Berbee et al. |
| 11,136,419 B2 | 10/2021 | Berbee et al. |
| 2012/0305284 A1 | 12/2012 | Nilsson et al. |
| 2014/0288257 A1 | 9/2014 | Zschoch et al. |
| 2014/0316094 A1 | 10/2014 | Berbee et al. |
| 2016/0102155 A1 | 4/2016 | Berbee et al. |
| 2017/0178763 A1* | 6/2017 | Nilsson .................. C08K 5/005 |
| 2017/0283526 A1 | 10/2017 | Berbee et al. |
| 2020/0148799 A1 | 5/2020 | Osby et al. |
| 2020/0161019 A1 | 5/2020 | Nilsson et al. |
| 2022/0017666 A1 | 1/2022 | Brown et al. |

\* cited by examiner

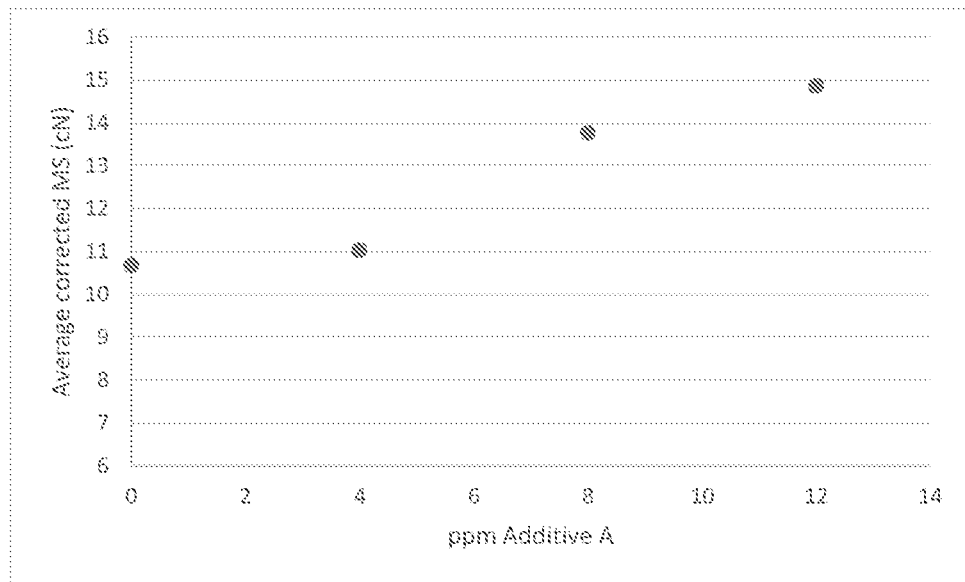

ETHYLENE-BASED POLYMER COMPOSITION WITH BRANCHING AND PROCESS FOR PRODUCING THE SAME

BACKGROUND

The level of branching in a low-density polyethylene (LDPE) is due predominantly to the reactor design and the polymerization conditions used to make the LDPE. Branching agents have been used to increase the level of branching in an LDPE. However, the process conditions required to achieve a modified LDPE with a high level of branching, often result in a final product with a lower crystallinity, and with a higher content of a low molecular weight extractable fraction. Thus, a need exists for a modified LDPE that has high branching levels, and that can be prepared under conditions that maintain good polymer properties.

SUMMARY

The present disclosure provides a composition. In an embodiment, the composition is an ethylene-based polymer composition formed by high pressure (greater or equal to 100 MPa) free radical polymerization. The composition includes ethylene monomer and a mixture of hydrocarbon-based molecules. Each hydrocarbon-based molecule includes three or more internal alkene groups.

The present disclosure provides a process. In an embodiment, the process includes reacting, in a polymerization reactor under free-radical polymerization conditions and at a pressure greater than or equal to 100 MPa, ethylene monomer and a mixture of hydrocarbon-based molecules. Each hydrocarbon-based molecule has the Structure I:

Structure I wherein m>n and m is from 3 to 90. The process includes forming an ethylene-based polymer composition.

BRIEF DESCRIPTION OF THE DRAWING

FIG. 1 is a graph showing average corrected melt strength (MS) versus ppm of Additive A present in the formant ethylene-based polymer in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure).

The numerical ranges disclosed herein include all values from, and including, the lower and upper value. For ranges containing explicit values (e.g., from 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "polymer" or a "polymeric material," as used herein, refers to a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Unless stated to the contrary, implicit from the context, or customary in the art, all parts and percents are based on weight, and all test methods are current as of the filing date of this application.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "ethylene/alpha-olefin copolymer," as used herein, refers to a copolymer that has more than 50 mole percent polymerized ethylene monomer (based on the total amount of polymerizable monomers), and at least one alpha-olefin.

The term "ethylene monomer," as used herein, refers to a chemical unit having two carbon atoms with a double bond there between, and each carbon bonded to two hydrogen atoms, wherein the chemical unit polymerizes with other such chemical units to form an ethylene-based polymer composition.

The term "high density polyethylene," (or HDPE) as used herein, refers to an ethylene-based polymer having a density of at least 0.94 g/cc, or from at least 0.94 g/cc to 0.98 g/cc. The HDPE has a melt index from 0.1 g/10 min to 25 g/10 min. The HDPE can include ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors. The ethylene/$C_3$-$C_{20}$ α-olefin copolymer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form.

The term "hydrocarbon-based molecule," as used herein, refers to a chemical component that has only carbon atoms and hydrogen atoms.

The term "linear low density polyethylene," (or "LLDPE") as used herein, refers to a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips)

The term "low density polyethylene," (or LDPE) as used herein, refers to a polyethylene having a density from 0.909 g/cc to less than 0.940 g/cc, or from 0.917 g/cc to 0.930 g/cc, and long chain branches with a broad molecular weight distribution (MWD greater than 3.0).

The term "terminal alkene group," as used herein, refers to a double bond between two carbon atoms in a polymer chain, wherein one of the carbons in the double-bond is =$CH_2$ group. Terminal double bonds are located at terminal ends of polymer chains and/or at the ends of branches. The term "internal alkene group," as used herein, refers to a 1,2-disubstituted carbon-carbon double bond. An internal alkene group is located throughout the length of a polymer chain, but not at a terminal end of the polymer chain or at a branched end along a polymer chain. Terminal alkene groups and internal alkene groups are measured by infrared spectroscopy ("FTIR").

The term "alkene content," as used herein, refers to the number of terminal alkene groups plus the number of internal alkene groups, present in a polymer chain for every 1000 carbon atoms. Alkene content is measured by infrared spectroscopy ("FTIR").

Test Methods

Density is measured in accordance with ASTM D792, Method B. Results are reported in grams per cubic centimeter (g/cc) Hexane Extractables The term "hexane extractables," as used herein, refers to the amount of hexane soluble material cleansed out of the resultant polymer composition by hexane. Polymer pellets (from the polymerization without further modification; 2.2 grams per press) are pressed to form a film, with a Carver Press, at a thickness from 3.0 to 4.0 mils. Pellets are pressed in two phases. The melt phase is at 190° C. for 3 minutes at 3000 pounds. The compressing phase is at 190° C. for 3 minutes at 40000 pounds. Non-residue gloves (PIP* CleanTeam* Cotton Lisle Inspection Gloves, Part Number: 97-501) are worn so as to not contaminate films with residual oils from hands of the operator. Films are die cut into "1 inch×1 inch" squares, and weighed (2.5±0.05 g). The films are then extracted for two hours in a hexane vessel at "49.5±0.5° C." in a heated water bath. After two hours, the films are removed, rinsed in clean hexane, and dried in a vacuum oven (80±5° C.) at full vacuum (ISOTEMP Vacuum Oven, Model 281A, at 30 inches Hg) for two hours. The films are then placed in a desiccator, and allowed to cool to room temperature for a minimum of one hour. The films are then reweighed, and the amount of mass loss due to extraction in hexane is calculated. This method is based on 21 CFR § 177.1520 (d)(3)(ii) with one deviation from FDA protocol by using hexane instead of n-hexane. Hexane extractable is reported in wt %.

Melt Force

A D-MELT apparatus (available from Goettfert GmbH Buchen, Germany) is used to determine melt force. The DMELT apparatus includes a commercial plastometer, and a digital balance incorporating a custom weighted sample. A molten polymer strand is extruded from a standard Plastometer barrel at a constant temperature (190° C.) through a standard ASTM D1238 MFR die (orifice height [8.000±0.025 mm] and diameter [2.0955±0.005 mm]) using a weighted piston. In the D-MELT apparatus, the extrudate is pulled through 2 free spinning rollers onto a drum driven by a stepper motor which is ramped over a velocity range during the analysis. The force of the polymer strand pulling up on the force sensor platform mounted tension roller is recorded by the integrated control computer in the D-MELT apparatus. From a curve fitting function of the acquired force data, the final reported value is determined based on a constant velocity ratio of the polymer strand speed versus the die exit speed (the exact velocity ratio depends on the product group). Measurement results are reported as melt elasticity ("ME") in centi-Newton (cN) or melt force ("MF") in milli-Newton (mN), depending on the rheometer type. Directly after the force measurement the melt index ("MI") measurement at ASTM conditions is performed with the same charge.

Melt Index

The term "melt index," or "MI" as used herein, refers to the measure of how easily a thermoplastic polymer flows when in a melted state. Melt index, or $I_2$, is measured in accordance by ASTM D 1238, Condition 190° C./2.16 kg, and is reported in grams eluted per 10 minutes (g/10 min). The I10 is measured in accordance with ASTM D 1238, Condition 190° C./10 kg, and is reported in grams eluted per 10 minutes (g/10 min).

Gel Permeation Chromatography (GPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A polynomial between $3^{rd}$ and $5^{th}$ order was used to fit the respective polyethylene-equivalent calibration points. A small adjustment to A (from approximately 0.375 to 0.440) was made to correct for column resolution and band-broadening effects such that a homopolymer polyethylene standard with a molecular weight of 120,000.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \quad (EQ\ 3)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (EQ\ 4)$$

$$Mw_{(GPC)} = \frac{\sum_i (IR_i * M_{polyethylene_i})}{\sum_i IR_i} \quad (EQ\ 5)$$

$$Mz_{(GPC)} = \frac{\sum_i (IR_i * M_{polyethlene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate}_{(effective)} = \text{Flowrate}_{(nominal)} * (RV_{(FM\ Calibrated)} / RV_{(FM\ Sample)}) \quad (EQ7)$$

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($MW_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $MZ_{(Abs)}$ are be calculated according to equations 8-9 as follows:

$$Mn_{(Abs)} = \frac{\sum_i IR_i}{\sum_i (IR_i / M_{Absolute_i})} \quad (EQ\ 8)$$

$$Mz_{(Abs)} = \frac{\sum_i (IR_i * M_{Absolute_i}^2)}{\sum_i (IR_i * M_{Absolute_i})} \quad (EQ\ 9)$$

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IR5) chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (10) and (11):

$$M_{PE} = (K_{PS}/K_{PE})^{1/\alpha PE+1} \cdot M_{PS}^{\alpha PS+1/\alpha PE+1} \quad (Eq.\ 10)$$

$$[\eta]_{PE} = K_{PS} \cdot M_{PS}^{\alpha+1}/M_{PE} \quad (Eq.\ 11).$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (12):

$$IV_w = \frac{\sum_i c_i IV_i}{\sum_i c_i} = \frac{\sum_i \eta_{spi}}{\sum_i c_i} = \frac{Viscometer\ Area}{Conc.Area} \quad (Eq.\ 12)$$

where $\eta_{spi}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume:

$$[\eta]_{cc} = \frac{\sum_i c_i IV_{i,cc}}{\sum_i c_i} = \frac{\sum_i c_i K(M_{i,cc})^a}{\sum_i c_i} \quad (Eq.\ 13)$$

Equation (14) is used to determine the gpcBR branching index:

$$gpcBR = \left[\left(\frac{[\eta]_{cc}}{[\eta]}\right)\left(\frac{M_w}{M_{w,cc}}\right)^{\alpha_{PE}} - 1\right] \quad \text{(Eq. 14)}$$

wherein [η] is the measured intrinsic viscosity, $[\eta]_{cc}$ is the intrinsic viscosity from the conventional calibration, Mw is the measured weight average molecular weight, and $Mw_{,cc}$ is the weight average molecular weight of the conventional calibration. The weight average molecular weight by light scattering (LS) is commonly referred to as "absolute weight average molecular weight" or "Mw, Abs." The Mw,cc using conventional GPC molecular weight calibration curve ("conventional calibration") is often referred to as "polymer chain backbone molecular weight," "conventional weight average molecular weight," and "$Mw_{,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.391, respectively, for polyethylene, and 0.722 and −3.993, respectively, for polystyrene. These polyethylene coefficients were then entered into Equation 13.

Once the K and α values have been determined using the procedure discussed previously, the procedure is repeated using the branched samples. The branched samples are analyzed using the final Mark-Houwink constants obtained from the linear reference as the best "cc" calibration values are applied.

The interpretation of gpcBR is straight forward. For linear polymers, gpcBR calculated from Equation (14) will be close to zero, since the values measured by LS and viscometry will be close to the conventional calibration standard. For branched polymers, gpcBR will be higher than zero, especially with high levels of long chain branching, because the measured polymer molecular weight will be higher than the calculated Mw,cc, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Fourier Transform Infrared analysis ("FTIR")

Determination of the amount of terminal and internal alkenes per 1000 carbons (or "1000C") is by Fourier Transform Infrared analysis ("FTIR"). Sample films (approximately 250-300 microns in thickness) used for FTIR analysis were compression molded by pressing approximately 0.5 g of pellets of the sample in a Carver hydraulic press with heated platens set to 190° C. The amount of terminal alkenes and internal alkenes per 1000 carbons were measured following a procedure similar to the one outlined in ASTM method D6248. FTIR measures internal alkene bonds in the trans configuration, internal alkene bonds in the cis configuration are not detectable by FTIR.

DETAILED DESCRIPTION

The present disclosure provides an ethylene-based polymer composition. The ethylene-based polymer composition includes the polymerization product of ethylene monomer and a mixture of hydrocarbon-based molecules. Each hydrocarbon-based molecule has three or more internal alkene groups.

In an embodiment, the ethylene-based polymer composition is formed from a process involving high pressure (greater than 100 MPa) and free-radical polymerization. Ethylene monomer and a mixture of hydrocarbon-based molecules, each molecule having three or more internal alkene groups, are reacted together to form the ethylene-based polymer composition. The polymerization process is discussed in detail below.

Hydrocarbon-Based Molecule

The ethylene-based polymer composition is the polymerization reaction product of ethylene and the mixture of hydrocarbon-based molecules. The term "hydrocarbon-based molecules," as used herein, refers to a chemical component that is a polymer chain composed of only carbon atoms and hydrogen atoms, the polymer chain may or may not have branches. The term "mixture of hydrocarbon-based molecules," as used herein, refers to two or more hydrocarbon-based molecules, wherein at least two of the molecules differ in structure, property, and/or composition.

In an embodiment, each of the hydrocarbon-based molecules in the mixture has the Structure I:

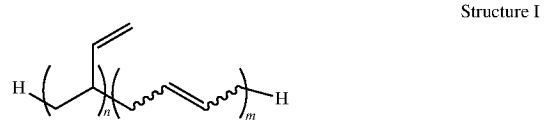

Structure I wherein m (the number of both cis- and trans-internal alkene groups) is from 3 to 90, and the value for m is greater than the value for n (m>n). In a further embodiment, m>n and m is from 3 to 90 and n is from 0, or 1, or 2, or 3 to 4, or 5; or m is from 6 to 60 and n is from 0, or 1, or 2, or 3 to 4, or 5; or m is from 9 to 50 and n is from 1, or 2 to 3, or 4.

In an embodiment, the mixture of hydrocarbon-based molecules consist of two or more hydrocarbon-based molecules having Structure I:

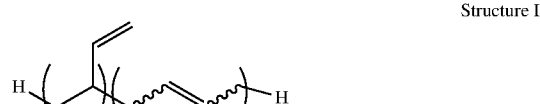

Structure I wherein m>n and n is the number of terminal alkene groups, m is the number of both cis- and trans-internal alkene groups, the average m content is from 3 to 90, and the average m content is greater than the average n content and the average n content is from 0, or greater than 0, or 0.5, or 1 or 5 to 7, or 10. The "average n content" is calculated by dividing the number average molecular weight (Mn) by the weight average molecular weight (Mw) of the hydrocarbon-based molecule, then multiplying by the fractional amount of terminal alkene groups. The "average m content" is calculated by dividing the number average molecular weight (Mn) by the weight average molecular weight (Mw) of the hydrocarbon-based molecule, then multiplying by the fractional amount of internal alkene groups.

In an embodiment, Structure I average m content is greater than the average n content and the average m content and average n content (denoted as "m/n") is as follows: 3-90/0-10, or 6-60/0.5-5, or 15-50/0.5-3.

In an embodiment, the mixture of hydrocarbon-based molecules based on Structure I has a molecular weight distribution from 1.2 to 20. In another embodiment, the mixture of hydrocarbon-based molecules based on Structure I has a molecular weight distribution from 1.2, or 1.3, or 1.4 to 2, or 5 to 10 or 20. In a further embodiment, the mixture of hydrocarbon-based molecules based on Structure I has a molecular weight distribution from 1.2 to 20, or from 1.3 to 10, or from 1.3 to 5.

In an embodiment, each of the hydrocarbon-based molecules has the Structure II:

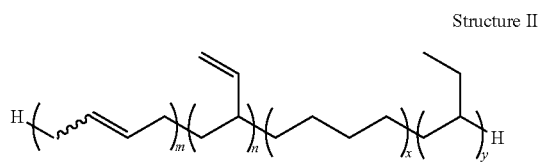

Structure II wherein m is greater than n; m is from 3 to 90; n is from 0 to 60; x is from 0 to 90; and y is from 0 to 10. In another embodiment, m is from 3, or 5, or 10, or 20, or 30, or 40; n is from 1, or 2, or 5, or 10 to 20, or 30; x is from 0, or 1 or 5, or 10, or 20, or 30 to 40, or 50, or 60 and y is from 0, or 1 to 5.

The hydrocarbon-based molecules of Structure I and/or Structure II are hereafter interchangeably referred to as "branching agent."

The notation "$\sim$" in Structure I and in Structure II represents a cis alkyl groups or a trans alkyl groups with respect to the double bond.

In an embodiment, a mixture of hydrocarbon-based molecules having the Structure I and/or the Structure II, with differing molecular weights, is used.

It is understood that the present ethylene-based polymer composition may include (i) Structure I only, (ii) Structure II only, or (iii) a combination of Structure I and Structure II. It is understood that the term "ethylene-based polymer composition," as used herein, refers to the polymer that is the reaction product of ethylene with Structure I and/or Structure II.

In an embodiment, the ethylene-based polymer composition includes, in polymerized form, from 95 wt %, or 96 wt %, or 97 wt %, or 98 wt % to 99 wt %, or 99.5 wt %, or 99.7 wt %, or 99.9 wt % of ethylene, and a reciprocal amount of the mixture of hydrocarbon-based molecules, or from 5.0 wt %, or 4.0 wt %, or 3.0 wt %, or 2.0 wt % to 1.0 wt %, or 0.5 wt %, or 0.3 wt %, or 0.1 wt % of the mixture of the hydrocarbon-based molecules. Weight percent is based on total weight of the ethylene-based polymer composition. In a further embodiment, the ethylene-based polymer composition includes, in polymerized form, from 95.0 wt % to 99.9 wt %, or from 96 wt % to 99.8 wt %, or from 98 wt % to 99.8 wt % of ethylene, and the mixture of hydrocarbon-based molecules is present in an amount from 5.0 wt % to 0.1 wt %, or from 4.0 wt % to 0.2 wt %, or from 2.0 wt % to 0.2 wt %.

In an embodiment, the present ethylene-based composition has a melt index (MI) from 0.1 to 100 g/10 min, or from 1 to 50 g/10 min, or from 2 to 25 g/10 min, or from 3 to 15 g/10 min, or from 3 to 10 g/10 min.

The ethylene-based polymer composition has a density from 0.909 g/cc to 0.940 g/cc. In an embodiment, the ethylene-based polymer composition has a density from 0.909 g/cc, or 0.915 g/cc, or 0.920 g/cc to 0.930 g/cc, or 0.935 g/cc, or 0.940 g/cc. In another embodiment, the ethylene-based polymer composition has a density from 0.910 g/cc to 0.940 g/cc, or from 0.915 g/cc to 0.935 g/cc, or from 0.917 g/cc to 0.930 g/cc, or from 0.917 g/cc to 0.926 g/cc.

The ethylene-based polymer composition has a terminal alkene content from 0.05/1000 carbons, or 0.08/1000 carbons, or 0.1/1000 carbons; the ethylene-based composition also has an trans-internal alkene content from 0.08/1000 carbons, or 0.10/1000 carbons to 1.2/1000 carbons, or 1.5/1000 carbons.

In an embodiment, the ethylene-based polymer composition has a terminal-to-internal alkene ratio from 0.1 to 2.0. In another embodiment, the ethylene-based polymer composition has a terminal-to-internal alkene ratio from 0.2 to 1.0, or from 0.2 to 0.8.

In an embodiment, the ethylene-based polymer composition has a total alkene content measured by FTIR greater than 0.1/1000 C, or from 0.15 to 1.0/1000 C, or from 0.2 to 0.8/1000 C.

In an embodiment the ethylene-based composition has a Mw/Mn greater than 8.0, or from 8.0 to 30.0.

In an embodiment, the ethylene-based polymer has a gpcBr value greater than 3.0, or from 3.05 to 3.40.

In an embodiment, the ethylene-based polymer composition has one, some, or all of the following properties:
(i) a MI from 0.1, or 0.5, or 1.0 to 5, or 10 g/10 min; and/or
(ii) a melt strength from 14.0 to 20.0 cN; and/or
(iii) a terminal alkene content from 0.08/1000 carbons, or 0.10/1000 carbons, or 0.15/1000 carbons, to 0.2/1000 carbons, or 0.24/1000 carbons, or 0.26/1000 carbons; and/or
(iv) a trans-internal alkene content from 0.08/1000 carbons, or 0.10/1000 carbons to 1.2/1000 carbons, or 1.5/1000 carbons; and/or
(v) a terminal-to-trans internal alkene ratio from 0.1 to 1, or from 0.2 to 0.5; and/or
(vi) a density from 0.910 g/cc to 0.935 g/cc.

In an embodiment, the ethylene-based polymer composition has one, some, or all of the following properties:
(i) a MI from 3.5 to 4.0 g/10 min; and/or
(ii) a melt strength from 14.0 to 20.0 cN.

In an embodiment, the ethylene-based polymer composition has (i) a MI of 4.0 g/10 min and (ii) a melt strength greater than 11.0 cN or from greater than 11.0 to 20.0 cN.

In an embodiment, the ethylene-based polymer composition includes a blend component. The blend component is a polymer that does not include the mixture of the hydrocarbon-based molecules (i.e., does not include a branching agent with Structure I or Structure II). Nonlimiting examples of suitable blend component include ethylene-based polymer, ethylene/alpha-olefin copolymer, ethylene/$C_3$-$C_8$ alpha-olefin copolymer, ethylene/$C_4$-$C_8$ alpha-olefin copolymer, and copolymers of ethylene and one or more of the following comonomers: acrylate, (meth)acrylic acid, (meth) acrylic ester, carbon monoxide, maleic anhydride, vinyl acetate, vinyl propionate, mono esters of maleic acid, diesters of maleic acid, vinyl trialkoxysilane, vinyl trialkyl silane, and any combination thereof.

In an embodiment, the blend component is an ethylene-based polymer that does not include the mixture of the hydrocarbon based molecules.

In an embodiment, the blend component is a high density polyethylene (HDPE).

In an embodiment, the blend component is linear low density polyethylene (LLDPE).

In another embodiment, the blend component is an ethylene/alpha-olefin copolymer. In a further embodiment, the alpha-olefin of the blend component is a $C_3$-$C_8$ alpha-olefin, or a $C_4$-$C_8$ alpha-olefin.

The present disclosure also provides an article comprising at least one component formed from the present ethylene-based polymer composition or a combination of two or more embodiments, described herein.

In an embodiment, the article is a coating of a film.

In an embodiment, the article is a coating.

In an embodiment, the article is a film.

The ethylene-based polymer composition includes a combination of two or more embodiments as described herein.

The article includes a combination of two or more embodiments as described herein.

Process

The present disclosure also provides a process of producing the present ethylene-based polymer composition. The process includes polymerizing ethylene monomer in the presence of the mixture of hydrocarbon-based molecules (Structure I and/or Structure II) in a reactor configuration providing high pressure (greater than 100 MPa) polymerization conditions. The reactor configuration is one or more tubular reactors and/or one or more autoclave reactors.

In order to produce a highly branched ethylene-based polymer composition, a high pressure, free-radical initiated polymerization process is used. Two different high pressure free-radical initiated polymerization process types are known. In the first process type, an agitated autoclave reactor having one or more reaction zones is used. The autoclave reactor normally has several injection points for initiator or monomer feeds, or both. In the second process type, a jacketed tube is used as a reactor, which has one or more reaction zones. Suitable, but not limiting, reactor lengths may be from 100 meters to 3000 meters (m), or from 1000 meters to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave reactors or tubular reactors having one or more reaction zones, or in a combination of autoclave reactors and tubular reactors, each comprising one or more reaction zones. In an embodiment, an initiator is injected prior to the reaction zone where free radical polymerization is to be induced.

In an embodiment, the process includes polymerizing ethylene monomer in the presence of the mixture of hydrocarbon-based molecules (Structure I and/or Structure II), chain transfer agent (CTA), and free radical initiator in a tubular reactor under high pressure (greater than 100 MPa) polymerization conditions. The tubular reactor is a multi-zone tubular reactor with alternate locations of feeding fresh ethylene to control the ethylene to CTA ratio and therefore control polymer properties. Fresh ethylene monomer is simultaneously added in multiple locations to achieve the desired ethylene monomer to chain transfer ratio. Addition of fresh CTA addition points is selected to control polymer properties. Fresh CTA is simultaneously added in multiple locations to achieve the desired CTA to ethylene monomer ratio. Likewise, the addition points and the amount of fresh hydrocarbon-based molecules (Structure I and/or Structure II), are controlled to control gel formation while maximizing the desired property of increased melt strength and performance in targeted applications. Fresh hydrocarbon-based molecules (Structure I and/or Structure II) is simultaneously added in multiple locations to achieve the desired hydrocarbon-based molecule-to-ethylene monomer ratio. The use of the mixture of hydrocarbon-based molecules to broaden molecular weight distribution and to increase the melt strength of the polymer will put further requirements on the distribution of the CTA and the mixture of hydrocarbon-based molecules along a reactor system in order to achieve the desired change in product properties while minimizing potential negative impacts such as gel formation, reactor fouling, process instabilities. Nonlimiting examples of suitable tubular polymerization reactors include tubular reactor and polymerization conditions as disclosed in WO2013059042(A1) and WO2013078018(A2), the entire content of each reference incorporated by reference herein.

Non-limiting examples of ethylene monomer used for the production of the ethylene-based polymer composition include purified ethylene, which is obtained by removing polar components from a loop recycle stream, or by using a reaction system configuration, such that only fresh ethylene is used for making the present ethylene-based polymer composition. Further examples of ethylene monomer include ethylene monomer from a recycle loop wherein the process includes a recycle loop to improve conversion efficiency.

One or more chain transfer agents (CTA) are added to the tubular reactor to control molecular weight. Non-limiting examples of suitable CTAs include propylene, isobutane, n-butane, 1-butene, methyl ethyl ketone, acetone, ethyl acetate, propionaldehyde, ISOPAR (ExxonMobil Chemical Co.), and isopropanol, and combinations thereof. The amount of CTA used in the process is from 0.01 weight percent to 10 weight percent, or from 0.01 weight percent to 5 weight percent, or from 0.1 weight percent to 1.0 weigh percent, or from 0.1 weight percent to 0.5 weight percent, or from 0.01 weight percent to 0.1 weight percent of the total reaction mixture.

In an embodiment, the CTA is propionaldehyde.

In an embodiment, the CTA is propylene.

One or more free radical initiators is fed into the tubular reactor to produce the ethylene-based polymer composition. Non-limiting examples of suitable free radical initiator include organic peroxides, cyclic peroxides, diacyl peroxides, dialkyl peroxides, hydroperoxides, peroxycarbonates, peroxydicarbonates, peroxyesters, peroxyketals, t-butyl peroxy pivalate, di-t-butyl peroxide, t-butyl peroxy acetate and t-butyl peroxy-2-hexanoate, and combinations thereof. In an embodiment, the free radical initiator includes at least one peroxide group incorporated in a ring structure. Non-limiting examples of free radical initiators with a peroxide group incorporated in a ring structure include TRIGONOX 301

(3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. The organic peroxy initiators are used in an amount from 0.001 wt % to 0.2 wt %, based upon the weight of polymerizable monomers.

In an embodiment, free radical initiator is a combination of tert-butyl peroxy-2-ethyl hexanoate and di-tert-butyl peroxide.

In an embodiment, the polymerization takes place in a tubular reactor having multiple reactor zones (from 3 to 6 reactor zones). The maximum temperature in each reactor zone is from 150° C. to 360° C., or from 170° C. to 350° C., or from 200° C. to 340° C. The pressure in each reactor zone is from 100 MPa to 380 MPa, or from 110 MPa to 340 MPa, or from 110 MPa to 300 MPa. The hydrocarbon-based molecules (Structure I and/or Structure II) are fed through a compression stage directly into the reaction zone or directly into the feed to the reaction zone.

In an embodiment, hydrocarbon-based molecules (Structure I and/or Structure II) are added prior to, or simultaneously with, the addition of the free-radical initiator, at the inlet of the reaction zone. In another embodiment, the hydrocarbon-based molecules (Structure I and/or Structure II) are added prior to the initiator addition to allow for a good dispersion.

In an embodiment, the hydrocarbon-based molecules (Structure I and/or Structure II) are fed only to reaction zone 1.

In an embodiment, the ethylene fed to the first reaction zone is from 10 percent to 100 percent of the total ethylene fed to the polymerization. In a further embodiment, the ethylene fed to the first reaction zone is from 20 percent to 80 percent, further from 25 percent to 75 percent, further from 30 percent to 70 percent, further from 40 percent to 60 percent, of the total ethylene fed to the polymerization.

In an embodiment, the tubular reactor has three reactor zones. The process includes maintaining the first reactor peak temperature from 290° C. to 310° C. and a pressure from 230 MPa to 200 MPa, maintaining the second reactor peak temperature from 290° C. to 310° C. and a pressure from 225 MPa to 195 MPa, and maintaining the third reactor peak temperature from 290° C. to 310° C. and a pressure from 220 MPa to 190 MPa. The process includes feeding CTA (propionaldehyde) and peroxy radical initiator (tert-butyl peroxy-2-ethyl hexanoate and di-tert-butyl peroxide) into each of the three reactor zones to control the peak temperatures in the reactor and the MI of the final product. Ethylene monomer, the hydrocarbon-based molecules (Structure I and/or Structure II) are fed to the first reactor zone only at a ratio from 0.0016 to 0.0048 kg (kilogram) hydrocarbon based molecule to kg ethylene. The process includes polymerizing ethylene monomer in the presence of the mixture of hydrocarbon-based molecules (Structure I and/or Structure II), chain transfer agent (CTA), and free radical initiator.

In an embodiment, the process includes polymerizing ethylene monomer in the presence of the mixture of hydrocarbon-based molecules (Structure I and/or Structure II), one or more additional monomers, chain transfer agent (CTA), and free radical initiator under the foregoing polymerization conditions. Nonlimiting examples for the additional monomer include propylene, 1-butene, 1-pentene, 1-hexene, 1-heptene, 1-octene, 1-nonene, 1-decene, and 4-methyl-1-pentene, acrylate, (meth)acrylic acid, (meth) acrylic ester, carbon monoxide, maleic anhydride, vinyl acetate, vinyl propionate, mono esters of maleic acid, diesters of maleic acid, vinyl trialkoxysilane, vinyl trialkyl silane, and any combination thereof.

Additives

In an embodiment, the composition includes one or more additives. Non-limiting examples of additives include stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the ethylene-based polymer composition.

In an embodiment the ethylene-based polymer composition is treated with one or more stabilizers, for example, antioxidants, such as IRGANOX 1010, IRGANOX 1076 and IRGAFOS 168. In general, the ethylene-based polymer composition is treated with one or more stabilizers before extrusion or other melt processes.

Applications

The ethylene-based polymer composition of the present disclosure may be employed in a variety of conventional thermoplastic fabrication processes to produce useful articles, including but not limited to monolayer and multi-layer films; agricultural films, molded articles, such as blow molded, injection molded, or rotomolded articles; coatings; fibers; and woven or non-woven fabrics, cables, pipes, green house films, silo bag films, collation shrink films, food packaging films, foams.

The ethylene-based polymer composition may be used in a variety of films, including but not limited to, clarity shrink films, agricultural films, collation shrink films, cast stretch films, silage films, stretch hood, sealants, and diaper backsheets. Other suitable applications include, but are not limited to, wires and cables, gaskets and profiles, adhesives; footwear components, and auto interior parts. The present ethylene-based polymer composition can be used as a part of the blend with LLDPE for agricultural films—big blown films.

Applicant unexpectedly discovered that ethylene polymerized with a mixture of hydrocarbon-based molecules with Structure I and/or Structure II with m>n and m 3 to 90, results in an ethylene-based polymer composition having an increased number of branching points, which results in greater melt force.

EXAMPLES

Polybutadiene (Additive A: Polyvest® 110 Structure I) was supplied from Evonik. Properties of Additive A are provided in Table 1 below.

TABLE 1

| | Mn (g/mol)[1] | n % terminal alkene[1] | m % internal cis- double bonds[1] | % internal trans- double bonds[1] | Avg n content[2] | Avg m content[2] |
|---|---|---|---|---|---|---|
| Additive A | 2,600 | 1 | 75 | 24 | 0.5 | 47.5 |

[1] Provided by Evonik
[2] Calculated by dividing Mn by Mw of butadiene monomer (hydrocarbon-based molecule) and multiplying by fractional amount of terminal alkene groups for n, and internal alkene groups for m. Example: Mn = 2,600 g/mol, Avg n = (2,600 g/mol)/(54.09 g/mol butadiene monomer) = ca. 48 repeat units*0.01 (terminal/total alkene) = ca 0.5 terminal vinyl groups per chain on average Polymerization: Autoclave Reactor Inventive Example 1 (IE 1): Additive A was loaded into a 316 stainless steel supply vessel, and diluted with Isopar™ E to produce a final concentration of 1.7 wt %. This vessel was purged with nitrogen for three hours before use and kept under 70 psig nitrogen pad during operation.

Various feed levels of this solution were introduced into the reactor to produce polymer samples.

Initiators: Peroxide initiator tert-butyl peroxyacetate (TPA, 20% by weight solution in ISOPARM™ H), and peroxide initiator di-tert-butyl peroxide (DTBP, 20% by weight solution in ISOPAR™ H), were combined with ISOPAR E, in a second 316 stainless steel supply vessel, to produce 1500 mass ppm TPA and 415 mass ppm DTBP (a ratio of 4:1 mole TPA/mole DTBP). The vessel was padded, de-padded, five times with 70 psig nitrogen before use, and kept under nitrogen pad during operation.

Ethylene was injected at 5500 gm/hr, at a pressure of 193 MPa, into an agitated (1600 rpm) 300 mL high pressure CSTR reactor, with an external heating jacket set to control the internal reactor temperature at 220° C. Propylene (CTA) was added to the ethylene stream at a pressure of 6.2 MPa, and controlled at a rate to produce a final product with a MI of 4 g/10 min, before the mixture was compressed to 193 MPa, and injected into the reactor. The solution of the appropriate additive solution was pumped at a pressure of 193 MPa directly into the reactor via a high pressure pump. The peroxide initiator solution was added directly to the reactor, through the sidewall, at a pressure of 193 MPa at a rate to control the ethylene conversion near 12%.

The details of the polymerization procedure for each experiment are shown in Table 2 below.

TABLE 2

Autoclave Polymerization Conditions (at ethylene feed 5,500 g/hr and at 220° C.)

| Experiment | Propylene (g/hr) | t-butyl peroxy- acetate (g/hr) | di-t- butyl peroxide (g/hr) | Additive A feed (g/hr) | Ethylene Con- version (%) | Polymer Collected (g/hr) |
|---|---|---|---|---|---|---|
| Control | 120 | 0.38 | 0.08 | 0 | 12.1 | 660 |
| IE 1 | 135 | 0.15 | 0.03 | 2.72 | 13.0 | 700 |

2. Melt Strength Experimentation

Additional samples were made under the autoclave polymerization conditions, disclosed above. In particular, Additive A feed rates were varied while holding melt index (MI) constant (at or near 4 g/10 min). Applicant discovered that while holding melt index constant, increasing the amount of Additive A increased the melt strength (MS) of the polymer. The results of the melt strength experimentation are shown in Table 3 below (MS(corrected)=log (MI)/log (4)*MS(measured)).

TABLE 3

Melt Strength Experimentation Results

| Additive | Amount fed (mol ppm) | MI ($I_2$) (g/10 min) | MS (cN, 190° C.) | MS corrected (cN, 190° C.) |
|---|---|---|---|---|
| None | 0 | 3.2 | 13.9 | 11.7 |
| None | 0 | 3.2 | 11.5 | 9.7 |
| None | 0 | 3.4 | 11.9 | 10.6 |
| Additive A | 4 | 4.9 | 10.1 | 11.5 |
| Additive A | 4 | 4.3 | 9.6 | 10.2 |
| Additive A | 4 | 4.0 | 11.3 | 11.4 |
| Additive A | 8 | 3.4 | 14.7 | 12.8 |
| Additive A | 8 | 3.1 | 14.1 | 11.5 |
| Additive A | 8 | 4.2 | 16.5 | 17.0 |
| Additive A | 12 | 3.7 | 14.8 | 13.9 |
| Additive A | 12 | 4.4 | 12.4 | 13.3 |
| Additive A | 12 | 3.6 | 19.1 | 17.4 |

FIG. 1 is a graph showing average corrected melt strength (MS) versus ppm of Additive A present in the formant ethylene-based polymer. FIG. 1 shows melt strength normalized to 4MI by way of the following equation:

$$MS(corrected)=log(MI)/log(4)*MS(measured).$$

FIG. 1 shows that holding MI constant (at or near 4 MI) the melt strength of the ethylene-based polymer increases as the amount of Additive A (Polyvest 110) present in the ethylene-based polymer increases.

3. FTIR Measurements

Amount of terminal double bonds (or vinyls) and amount of trans-internal double bonds per 1000 C was measured by FTIR (Table 4), where Vinyls/Trans normalized=(Vinyls in inventive example−Vinyls in baseline)/(Trans in inventive example−Trans in baseline)

TABLE 4

FTIR results*

| Description | Vinyls+/1000 C. | Trans/1000 C. | Vinyl/Trans | Vinyl/Trans norm. |
|---|---|---|---|---|
| Baseline | 0.1292 | 0.0476 | 2.71 | |
| IE2 Additive A - 4 ppm added | 0.1263 | 0.1942 | 0.65 | −0.02 |

TABLE 4-continued

| | FTIR results* | | | |
|---|---|---|---|---|
| Description | Vinyls+/1000 C. | Trans/1000 C. | Vinyl/Trans | Vinyl/Trans norm. |
| IE 3 Additive A - 8 ppm added | 0.0921 | 0.3435 | 0.27 | −0.13 |
| IE 4 Additive A - 12 ppm added | 0.113 | 0.4153 | 0.27 | −0.04 |

*FTIR measures internal alkene bonds in the trans configuration, internal alkene bonds in the cis configuration are not detectable by FTIR.
+vinyls = terminal alkene double bond It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An ethylene-based polymer composition comprising:
in polymerized form, based on the total weight of the ethylene-based polymer composition
(i) from 95 wt % to 99.98 wt % ethylene monomer, and
(ii) from 5.0 wt % to 0.02 wt % of a mixture of hydrocarbon-based molecules, each hydrocarbon-based molecule having three or more internal alkene groups, and each hydrocarbon-based molecule has the Structure I:

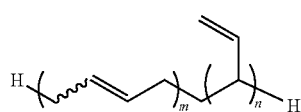

Structure I wherein m>n and m is from 3 to 90.

2. The ethylene-based polymer composition of claim 1, wherein the mixture of hydrocarbon-based molecules based on Structure I has a molecular weight distribution from 1.2 to 10.

3. The ethylene-based polymer composition of claim 1, wherein the hydrocarbon-based molecules have the Structure II:

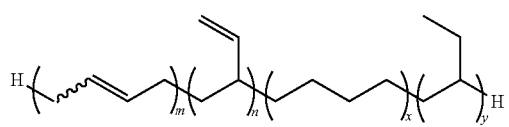

Structure II wherein m>n and m is from 3 to 90; n is from 0 to 60; x is from 0 to 90, and y is from 0 to 90.

4. The ethylene-based polymer composition of claim 3, wherein the mixture of hydrocarbon-based molecules based on Structure II has a molecular weight distribution from 1.2 to 10.

5. The ethylene-based polymer composition of claim 1, wherein the ethylene-based polymer composition has a terminal alkene content from 0.05/1000 carbons to 0.2/1000 carbons.

6. The ethylene-based polymer composition of claim 1, wherein the ethylene-based polymer composition has an internal trans-alkene content from 0.1/1000 carbons to 2/1000 carbons.

7. The ethylene-based polymer composition of claim 1, wherein the ethylene-based polymer composition has a density from 0.909 g/cc to 0.940 g/cc.

8. The ethylene-based polymer composition of claim 1, further comprising a blend component, wherein the blend component does not include the mixture of hydrocarbon-based molecules.

9. An article comprising the composition of claim 1.

10. The article of claim 9, wherein the article is selected from the group consisting of a film, a coating, a coating for a cable, a coating for a wire, and a coated sheet.

11. The ethylene-based polymer composition of claim 1, wherein m is from 15 to 60 and n is from 0.5 to 5.

12. A process comprising:
reacting, in a polymerization reactor under free-radical polymerization conditions and at a pressure greater than or equal to 100 MPa, ethylene monomer and a mixture of hydrocarbon-based molecules, each hydrocarbon-based molecule having the Structure I:

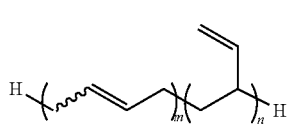

Structure I wherein m>n and m is from 3 to 90; and
forming an ethylene-based polymer composition comprising in polymerized form, based on the total weight of the ethylene-based polymer composition
(i) from 95 wt % to 99.98 wt % ethylene monomer, and
(ii) from 5.0 wt % to 0.02 wt % of the hydrocarbon-based molecule of Structure I.

13. The process of claim 12, wherein the polymerization takes place in a reactor configuration comprising at least one tubular reactor.

14. The process of claim 12, wherein the polymerization takes place in a reactor configuration comprising at least one autoclave reactor.

15. The process of claim 12 wherein m is from 15 to 60 and n is from 0.5 to 5.

* * * * *